2,852,541

HYDROGENATION PROCESS AND PRODUCT

Hans P. Kaufmann, Munster, Westphalia, Germany

No Drawing. Application July 25, 1956
Serial No. 599,892

2 Claims. (Cl. 260—409)

This invention relates to a process for the hydrogenation of unsaturated glyceride oils and contemplates a hydrogenated oil of greatly improved nutritional value.

It is an important object of this invention to provide a hydrogenated glyceride oil which contains substantially all of the nutritionally valuable constituents of the natural oils such as the pro-vitamin carotene, chlorophyll and others.

A further object of this invention is to provide a hydrogenated glyceride oil containing a negligible amount of iso-acids whereby its chemical properties will be those of the natural oil.

Another object of this invention is to provide an improved process for hydrogenating those glyceride oils obtained from oleaginous material by solvent extraction methods.

Still another object of this invention is to provide a process whereby glyceride oils obtained from oleaginous materials by solvent extraction can be hydrogenated in the extractant.

Another object of this invention is to provide a process for the hydrogenation of glyceride oils in their crude form.

A further object is to provide a hydrogenation process operable on a continuous basis.

Other objects will appear hereinafter.

The hydrogenation of glyceride oils obtained by means of solvent extraction from oleaginous materials has heretofore been accomplished in the following manner:

The oil is separated from its solvent and refined after which hydrogen gas in introduced into the refined oil in the presence of a catalyst and the system is agitated and maintained at a temperature well above 100° C.

The temperatures required by this process are such that the minor nutritional constituents such as carotene are readily oxidized, and are therefore not present in the final product. Furthermore, even though the oil is highly refined prior to hydrogenation, there are present some impurities commonly referred to as catalyst poisons which tend to adsorb onto the catalyst, thereby deacting it. Moreover, as the catalyst adsorbs these poisons, there is a marked effect upon the selectivity of the reaction in that the final product contains a large proportion of iso-acids which result from a combination of high temperatures and "poisoned" catalyst.

I have discovered that glyceride oils obtained from oleaginous materials by conventional solvent extraction processes can be successfully hydrogenated in their crude form provided hydrogenation is conducted while the crude oil is still dissolved in its solvent. Moreover, the resultant product possess novel properties which are of great nutritional value. My process comprises passing the solvent-crude oil mixture, or miscella, through a vessel charged with a suitable catalyst and simultaneously counterflowing hydrogen gas therethrough. I have discovered that by hydrogenating in this manner I can operate at greatly reduced temperatures, whereby there is no thermocatalytic destruction of the valuable nutrient constituents contained in the crude oil, such as carotene, which are destroyed in currently known hydrogenation processes. Another surprising result derived from my process is the great reduction of the amount of iso-acids formed, with the result that the final product possesses the chemical properties of the natural oils which have heretofore been impossible to obtain. Another novel aspect of my invention is the extended active life of the catalyst.

Example #1

A miscella containing 30% crude peanut oil having an iodine value of 97 and 70% hexane was passed through a column charged with coarse Raney nickel at a rate which maintained four parts by weight of miscella to one part by weight of nickel. A counter-flow of hydrogen was bubbled through the column and the reaction temperature was maintained at 35° C. The peanut oil then had an iodine value of 49 and an iso-acid content of 0.5%.

These results are compared with hydrogenation of the crude oil per se and the refined oil in the following table.

|  | Temp., °C. | Initial I. V. | I. V. Reduction | Percent Iso-Acid |
|---|---|---|---|---|
| Miscella | 35 | 97 | 48 | 0.5 |
| Crude Oil | 35 | 97 | nil | |
| Refined Oil | 35 | 97 | nil | |

In order to obtain an I. V. of 50 in the refined oil it was necessary to elevate the operating temperature to 180° C. and this product contained 32.0% iso-acids.

Example #2

A miscella containing 20% crude palm oil having an iodine value of 59 was hydrogenated in the manner described in Example #1. The hydrogenated fat obtained had a final I. V. of 39 and was colored a deep yellow due to the presence of carotene. By comparison, palm oil which has been hydrogenated according to conventional methods contains no measurable amount of carotene and has an iso-acid content well in excess of 10%.

Example #3

Crude soybean oil miscella containing 30% oil with an I. V. of 130 was hydrogenated in the manner outlined in Example #1, except that a ratio of three parts miscella to one part nickel was maintained, and the hydrogenated oil had a final I. V. of 65.

Repeated runs with additional samples of this soybean oil miscella, for a period of several weeks, showed no deactivation of the catalyst as measured by the iso-acid and carotene content of the hydrogenated oil, whereas conventional processes require frequent reactivation of the catalyst.

Example #4

A crude corn oil miscella containing 30% oil with an I. V. of 129 was treated in the manner outlined in Example #1, and the hydrogenated oil had an I. V. of 70. This was repeated a second time, but the rate at which the miscella flowed over the catalyst was reduced to approximately one-half, and the hydrogenated oil had an I. V. of 35.

It can be seen from the foregoing examples that the instant invention affords the advantages of continuous processing, a greatly simplified and more economical method, greater control over the final I. V. to be obtained and an improved product resulting from the absence of iso-acids and the retention of the highly volatile minor constituents such as the pro-vitamins, which are of nutritional importance.

The above mentioned proportions of oil to solvent are not critical but the proportions normally resulting from a solvent extraction process are within the scope of this disclosure. These proportions may vary from approximately 10% to 40% oil, the balance being a solvent such as benzene, hexane or the like.

The above-mentioned temperatures are not to be regarded as critical except that the temperature may be relatively low as compared with conventional hydrogenation practices. In order to minimize the formation of iso-acids the hydrogenation is preferably conducted at temperatures under 100° C.

Having thus described my invention, what I claim is:

1. The process of obtaining an hydrogenated vegetable oil containing less than 2% iso-acids and containing all of the carotene present in the natural vegetable oil which consists in extracting said vegetable oil from a vegetable source by means of a solvent and hydrogenating said vegetable oil to a reduced iodine value by passing hydrogen through the resulting solution of crude vegetable oil and extraction solvent at a temperature below about 100° C. and in the presence of an hydrogenation catalyst.

2. The process of obtaining an hydrogenated vegetable oil containing less than 2% iso-acids and containing the nutritional components present in the natural vegetable oil which consists in extracting said vegetable oil from a vegetable source by means of a solvent and hydrogenating said vegetable oil to a reduced iodine value by passing hydrogen through the miscella of crude vegetable oil and extraction solvent at a temperature below about 100° C. and in the presence of an hydrogenation catalyst.

References Cited in the file of this patent

UNITED STATES PATENTS

| | | |
|---|---|---|
| 1,097,456 | Maryott | May 19, 1914 |
| 1,890,585 | Newton | Dec. 13, 1932 |
| 2,380,408 | Buxton | July 31, 1945 |